Feb. 5, 1946.   A. FRIEDRICH   2,394,299
DRIVE FOR OPPOSITELY ROTATING PROPELLERS
Filed Jan. 16, 1941
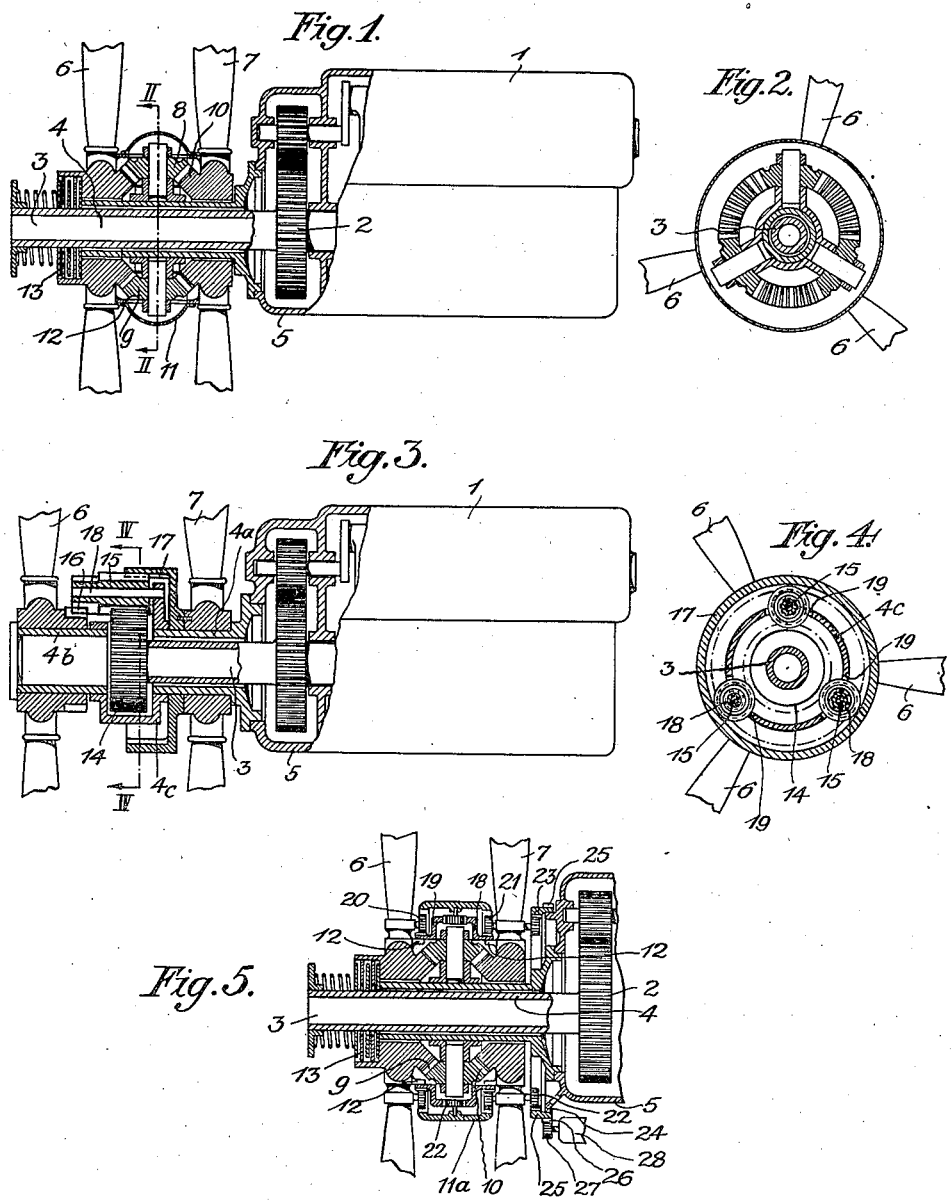
INVENTOR:
ALBERT FRIEDRICH
BY
Haseltine, Lake & Co.
ATTORNEYS Patented Feb. 5, 1946

2,394,299

UNITED STATES PATENT OFFICE 2,394,299

DRIVE FOR OPPOSITELY ROTATING PROPELLERS

Albert Friedrich, Stuttgart-Bad Cannstatt, Germany; vested in the Alien Property Custodian Application January 16, 1941, Serial No. 374,672
In Germany February 5, 1940

3 Claims. (Cl. 170—135.6)

The present invention relates to driving arrangements and more particularly refers to a drive for air propellers rotating in opposite directions. Hitherto two propeller shafts arranged one in the other have been driven by a gear mounted at the motor and rotating in a right hand and a left hand direction respectively. At the ends of these shafts the propellers were fixed.

Now, the present invention consists in arranging the air propellers upon a non-rotatable tube, preferably fixed to the motor or the gear casing, and driving them by a shaft mounted in the interior of this tube.

The arrangement according to the invention has the advantage that for the drive of air propellers rotating in opposite directions a normal, substantial gear may be maintained at the motor, and that the weight of the propellers as well as centrifugal moments and torsional vibrations of the rotating members are absorbed by the stationary bearing tube only. The latter transmits all stresses occurring not to the driving gear but directly to the large mass of the motor or gear block which easily absorbs or at least strongly damps all stresses. Moreover, the reversal gear may be arranged between the propellers due to the stationary bearing point resulting from the tube. This also allows an arrangement of the propellers very close to the gear block of the motor and this results in a shortening of the length of the construction as well as in a further reduction of the weight and a substantial improvement in the driving gear.

In the accompanying drawing some constructions according to the invention are shown by way of example.

In this drawing:

Fig. 1 shows a longitudinal section through the mounting and the drive of two air propellers in which the propellers are driven from the front end;

Fig. 2 is a cross section on line II—II of Fig. 1;

Fig. 3 is a longitudinal section through a mounting and a drive of two propellers rotating in opposite directions and driven by a spur gear arranged between them;

Fig. 4 is a cross section on the line IV—IV of Fig. 3; and

Fig. 5 shows a longitudinal section through the mounting and a drive of two variable pitch propellers rotating in opposite directions.

By way of a normal speed reducing gear 2 the motor 1 drives a preferably elastically rotatable hollow shaft 3. The latter is mounted with play in a tube 4 which is directly fixed to the motor or gear casing 5. Journalled upon the tube 4 are two air propellers 6 and 7 between which a bevel wheel gearing 8 is arranged cooperating with bevel gears 9 and 10 respectively. The rim 9 is fixed upon the hub of the propeller 6 and the rim 10 upon the hub of the propeller 7. The gearing is surrounded by an enclosure or cover 11 the lateral edges of which may bear freely for instance at 12 on the hubs of the two air propellers, whereby the frictional forces, acting in opposite directions upon the cover, are in equilibrium, and the cover remains stationary during rotation of the air propellers. The cover 11 may also be connected to a stationary member of the aircraft. The hollow driving shaft 3 extends somewhat beyond the free end of the bearing tube 4 and mounted upon this end of the driving shaft is a member absorbing torsional vibrations, for instance a disc friction clutch 13 the driven portion of which is rigidly connected to the hub of the air propeller 6 most closely arranged to same.

The driving arrangement described above acts in such manner that, by means of the disc friction clutch 13, the hollow shaft 3 drives the air propeller 6, and the rim 9 of the gear appertaining to this propeller drives the bevel gearing 8. The latter in turn and by way of the rim 10 of the bevel gear drives the shaft of the air propeller 7 at the same number of revolutions and a direction of rotation opposite to that of the shaft of the air propeller 6. Torsional vibrations occurring are thus absorbed by the elastically rotatable shaft 3 and the clutch 13, while gyroscopic momentums are absorbed by the tube 4. The clutch 13 is preferably adjustable. Instead of a disc friction clutch any other suitable clutch, for instance a liquid clutch, may be used.

In the modification shown in Figs. 3 and 4, the two air propellers 6 and 7 are driven by a spur gearing. For this purpose the bearing tube of the air propeller is subdivided into two members 4a and 4b of substantially equal length. As has been described in connection with the modification shown in Figs. 1 and 2, the tube member 4a is fixed to the casing 5 of the motor gear. By a drum-like enlargement 4c the other tube member 4b is held in such a way that it has a common axis with the tube member 4a. The enlargement 4c is shifted upon the free end of the tube member 4a and fixed to same. The driving shaft 3 extends into the bearing tube 4a, 4b as far as to the enlargement 4c only and its free end carries a spur gear 14 which rotates in the enlargement 4c. The spur gear 14 engages a gear wheel 15 which on the one hand cooperates with the outer gear teeth 16 of a hub neck of the air propeller 6 and on the other hand with the inner gear teeth 17 of a hub neck of the air propeller 7. The gear 15 is rotatably mounted upon a bolt 18 fixed upon a side wall of the drum-like enlargement 4c of the bearing tube. Preferably three such bolts or gears are uniformly distributed about the circumference of the spur gear 14 mounted on the end of the driving shaft 3, and the drum-like tube member 4c is provided at these points with corresponding recesses 19 to allow the gears 15 to cooperate with the spur gear 14. The enlargement 4c is not required, if the outer diameter of the spur gear 14 is smaller than the inner diameter of the bearing tube 4a, 4b.

The operation of the arrangement shown in Figs. 3 and 4 easily appears from the drawing. The elastically rotatable shaft 3 drives the spur gear 14 and the gears 15 driven by the spur gear 14 drive the two air propellers 6 and 7 by way of the gearings 16 and 17 in opposite directions but at the same number of revolutions. With this modification also a clutch elastic in the direction of rotation may additionally be provided on the shaft 3, for instance within the spur gear 14.

The invention also is very well adapted for the drive of a variable pitch air propeller, as shown in Fig. 5. For this purpose gearing 18 and 19 are rotatably mounted upon the guide rings 12 of the hubs of the air propellers. The gearing 18 and 19 on the one hand cooperate with the variable pitch pinions 20 and 21, provided on the hubs of the air propellers and serving for adjustment, and on the other hand with a common intermediate pinion 22. The shafts of the pinions 22 arranged vertically to the shaft of the air propeller are rotatably mounted in a casing part 11a. The gearing 21 for adjusting the air propeller 7 are mounted upon rotating shafts, extending through the appertaining hub, and mounted upon the other ends of these shafts are adjusting gears 23 which for instance cooperate with the inner gear teeth 29 of a gear wheel 25 mounted at 24 at the gear casing 5. The gear wheel 25, moreover, is provided with a second toothing 26 into which engages the driving pinion 27 of a variable pitch gear 28. The latter may be arbitrarily or automatically in any known manner, as controlled for instance, in dependence on the number of revolutions of the drive shaft or shafts of the air propeller or air propellers respectively.

The operation of the arrangement just described is as follows:

By virtue of the opposite directions of rotation of the gearing 18 and 19 connected to the air propellers 6 and 7 respectively the intermediate pinions 22 are rotated, maintain, however, their position in the space. Thus a fixed point is provided by means of which the adjusting forces may be made effective which come into action if the position of the propeller blades is varied. The impulse given by pinion 27 of the variable pitch gear is transmitted by means of the gear 25 upon the adjusting pinions 23, 21, the gear 18, the intermediate pinions 22, the gear 19 and finally upon the variable pitch wheels 20. Although not shown in the drawings the axes of the variable pitch pinions are preferably provided with worms which engage with a worm gear fixed to the rotatably mounted blades of the air propeller. The air propeller may be provided with any desired number of blades. Moreover, more than two air propellers may be arranged one behind the other. A feeding device for the lubricating oil of the gear may be coupled to the intermediate gear, so that for instance the stationary casing 11a simultaneously may be made to serve as a lubricating oil tank and be provided with corresponding channels leading the lubricating oil to the points to be lubricated. The gearing for the variable pitch gear or the control rod system of the latter respectively may also be located in the hollow driving shaft 3 and act upon the variable pitch gear provided on the air propellers from the front or from the space between the air propellers. The selected arrangement, however, has the advantage that the hollow space of the driving shaft 3 is available for other purposes. Of course, a solid driving shaft may also be used. Furthermore, the air propellers may be driven at mutually different speeds.

The invention quite generally is an improvement in drives in which a primary shaft resiliently drives a secondary shaft in the direction of rotation by means of an intermediate member damping torsional vibrations, and in so far as accords with the subject matter of the invention, the secondary shaft is released as far as possible from gyroscopic momentums and bending stresses by the bearing tube arranged between the primary and secondary shaft, so that practically torsional moments only are absorbed by the two shafts and no transverse forces act on the damping member arranged between the two shafts.

The driving arrangement according to the invention also be used for driving a single airscrew or two air-screws combined and rotating in the same direction or any other screw driving mechanism, e. g. a ship propeller.

Having now particularly described and ascertained the nature of my said invention and in what manner the same is to be performed I declare that what I claim is:

1. A driving means for simultaneously controlling and rotating two propellers in opposite directions including, a source of mechanical power including a stationary portion, a tubular member rigidly secured to said stationary portion and having a free end extending therefrom, a first propeller rotatably mounted on said tubular member near the free end thereof, a second propeller rotatably mounted on said tubular member to adjacent said stationary portion, a shaft driven by said source of power and extending through said tubular member and resiliently yieldable in the driving direction to a sufficient extent to absorb torsional vibrations, a friction clutch drivingly connecting said shaft with said first propeller, a reversing gear assembly positioned on said tubular member between said propellers and mechanically connecting said first propeller to said second propeller so as to drive a said second propeller in the opposite direction from said first propeller, said propellers having changeable-pitch blades, pitch control means including individual control units mounted on each of said propellers and operatively connected to the blades of said propellers, synchronizing means producing simultaneous actuation of the control units of both propellers, said synchronizing means including a ring gear and pinion assembly mounted around said reversing gear assembly, and pitch adjusting means comprising means mounted on said stationary portion and having operative connection with the control units of said second propeller.

2. Apparatus, as described in claim 1, wherein said ring gear and pinion assembly includes an annular pinion carrier surrounding said reversing gear assembly, a plurality of pinions mounted on said pinion carrier with their axes extending radially with respect to the axes of said tubular member, and other ring gears meshed with opposite sides of the pinions and operatively engaging the control units of the first and second propellers.

3. In combination, a pair of propellers for simultaneous rotation in opposite directions, a stationary rigid tubular member upon which said pair of propellers is mounted, said tubular member containing a driving shaft extending axially therethrough and having resilient yielding connection with one of the propellers, a reversing gear assembly positioned between and operatively connecting said propellers for rotation in opposite directions, said propellers having adjustable-pitch blades and individual pitch changing units for the blades, ring gears mounted for operative engagement with the pitch changing units of the propellers, each ring gear being effective when rotated to change the pitch of all of the blades of the related propeller, a stationary group of pinions located between and meshed with said ring-gears, additional pinions mounted on the pitch adjusting units of one of said propellers, a ring gear mounted to drive all of said additional pinions, and gear means for turning the last named ring-gear to effect adjustment of the blades of both propellers substantially simultaneously.

ALBERT FRIEDRICH.